United States Patent [19]

Young

[11] Patent Number: 5,758,450
[45] Date of Patent: Jun. 2, 1998

[54] LASER-ILLUMINATED LURES

[76] Inventor: Bruce A. Young, 2475 S. Orange Blossom Trail, Orlando, Fla. 32805

[21] Appl. No.: 752,708

[22] Filed: Nov. 18, 1996

[51] Int. Cl.[6] .................................................. A01K 85/01
[52] U.S. Cl. ............................................................ 43/17.6
[58] Field of Search ............................................. 43/17.6

[56] References Cited

U.S. PATENT DOCUMENTS

| | | | |
|---|---|---|---|
| 757,077 | 4/1904 | Whipple | 43/17.6 |
| 2,190,791 | 2/1940 | Larson | 43/17.6 |
| 3,213,562 | 10/1965 | Salvin | 43/17.6 |
| 4,272,674 | 6/1981 | Garr | 43/17.6 |
| 4,347,681 | 9/1982 | Fima | 43/17.6 |
| 4,638,584 | 1/1987 | Lindsay | 43/17.6 |
| 5,063,700 | 11/1991 | Kiefer | 43/17.6 |
| 5,084,996 | 2/1992 | Woodruff | 43/42.33 |
| 5,175,951 | 1/1993 | Fruchey | 43/17.6 |

OTHER PUBLICATIONS

HSN Marketing, Inc. CL 2003 Ultra–Slim Laser Pointer Brochure.

*Primary Examiner*—Jack W. Lavinder
*Attorney, Agent, or Firm*—John M. Harrison

[57] ABSTRACT

Laser-illuminated lures which are characterized by lures of selected design having a hard or soft body and fitted with a laser beam-emitting mechanism or device which includes a laser emitter, a laser circuit board and a battery for energizing the circuit board and laser emitter. In a preferred embodiment the laser device is implanted in the lures and the laser emitter positioned to highlight one or more features of the lures such as a spinner, skirt, hook or the like to attract fish to the lure. In another preferred embodiment more than one laser device may be implanted or otherwise positioned inside a lure to highlight various features of the lure, as desired. The laser circuit may be energized by tightening a removable segment of the lure against a spring seated on the battery which supplies electricity to the laser circuit or by a switch mounted in the lure body.

20 Claims, 2 Drawing Sheets

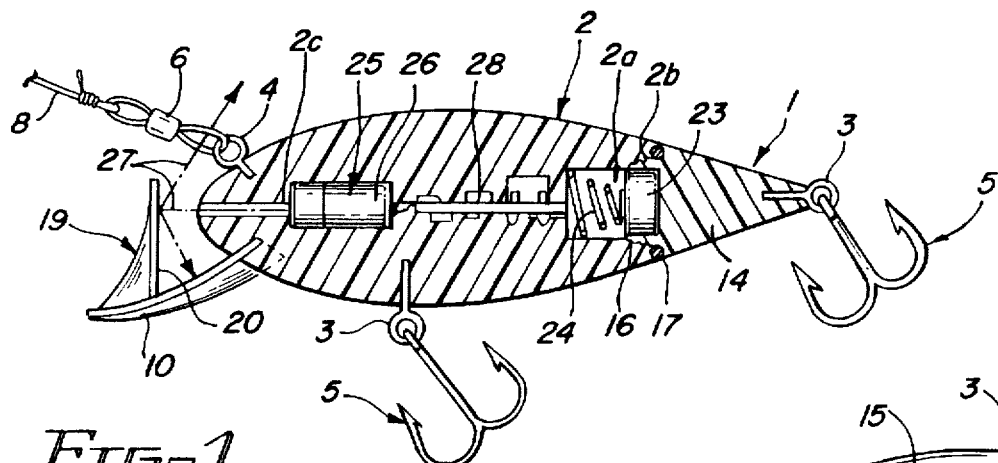
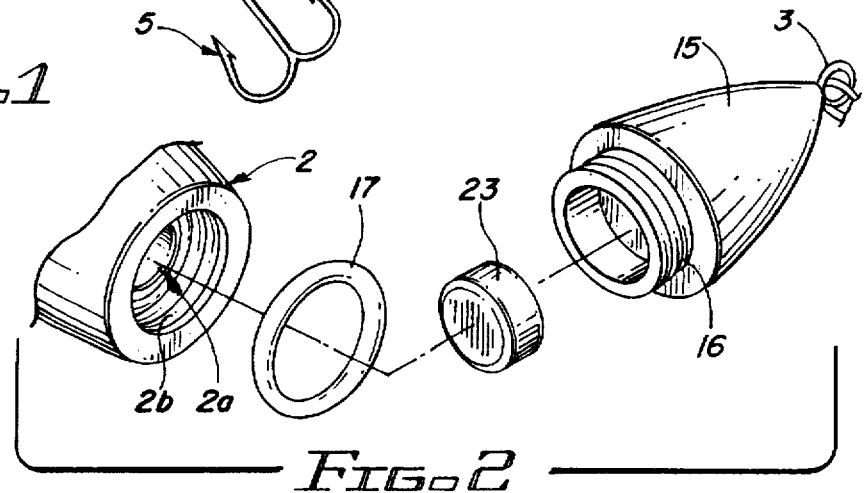
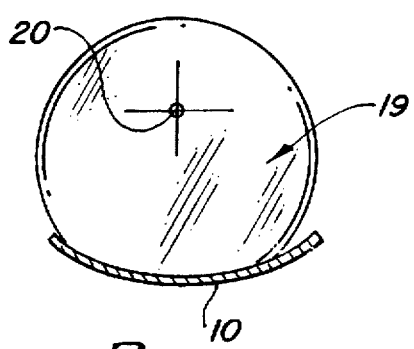
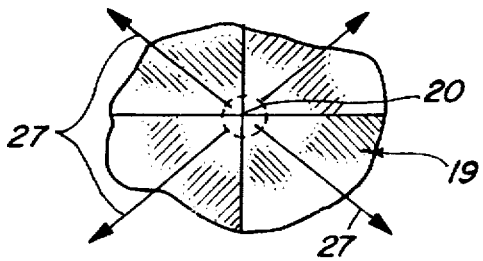
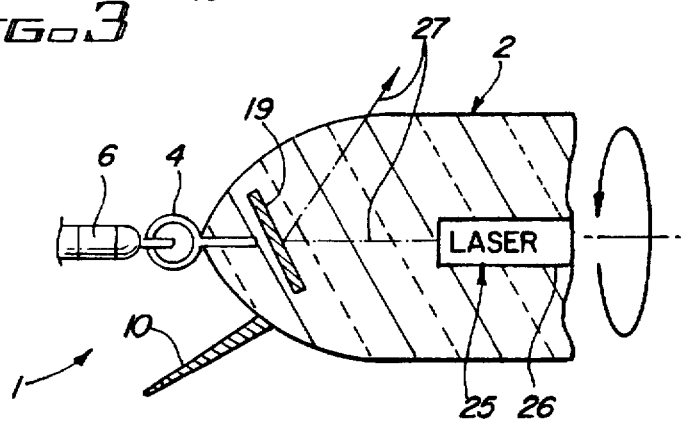

LASER-ILLUMINATED LURES

BACKGROUND OF THE INVENTION

Field of The Invention

The invention relates to fishing lures and more particularly, to laser-illuminated fishing lures which contain one or more laser circuit and/or emitter for highlighting selected features or features of the lures. In a preferred embodiment the laser device is characterized by a laser emitter positioned to highlight such features as the skirt, hook, spinner or other feature of a lure and a laser circuit board electrically connected to the laser emitter to facilitate the laser operation. A battery is positioned in contact with the laser circuit board to provide power for the laser device and a switch may be provided in the lures to energize the laser circuit or the circuit may be energized by tightening removable elements of the lures against the battery and a spring provided in the circuit to operate the laser device.

It is known that light attracts fish. One of the earliest techniques for attracting fish was the burning of stumps and trees on a water body to attract insects which fell in the water and provided food for the fish. Lanterns were later suspended over the water body from trees or brush to achieve the same result. Small, battery-powered lights have also been mounted in fishing lures to achieve the same result, with varying degrees of success, depending upon water clarity and other factors. However, these lights lack sufficient intensity to be effective, particularly under circumstances where the water is not clear and the bulbs soon burn out or grow dim due to short battery life.

Various illuminated fishing lures are known in the art. Typical of these lures is the Luminescent Fishing Lures disclosed in U.S. Pat. No. 4,638,584, to William R. Lindsay, which includes lures having a chemiluminescent material in a body cavity in the lures facilitate glowing of the lures as the lures are retrieved through a water body. U.S. Pat. No. 5,084,996, dated Feb. 4, 1992, to Chester G. Woodruff, et al, details a "Fishing Lure Laser Surface pattern Cut Reflective patterned Spinner Blade"which is cut by a laser beam into approximately 144 thousand pictel cuts per inch. The blade reflects light in a spinning action as the lure is retrieved through a water body. U.S. Pat. No. 5,175,951, dated Jan. 5, 1993, to Russell L. Fruchey, details an illuminated fishing lure. The lure is hollow and a light-emitting diode (LED) is inserted in the hollow cavity with a power supply circuit also located in the cavity of the lure for energizing the light-emitting diode. The lure glows due to operation of the light-emitting diode as it is retrieved through a water body.

It is an object of this invention to provide laser-illuminated lures which are characterized by one or more laser circuits and/or emitters powered by a battery located inside the lures, wherein the emitter is positioned to highlight one or more features of the lures as the lures are retrieved through a water body.

Another object of this invention is to provide a laser-illuminated lure for retrieval through a water body, wherein a specific feature or features of the lure is/are highlighted by a laser beam to attract fish to the lure.

Another object of this invention is to provide a laserilluminated lure which is characterized by a hard or soft body lure provided with an internal laser device, wherein the laser emitter element of the device is positioned to highlight one or more features of the lure such as a rotating spinner, flexible skirt or hook to attract fish to the lure.

Still another object of this invention is to provide laser-illuminated lures which are each characterized by a hard or soft body containing one or more laser-emitting elements and a laser circuit electrically connected to the laser-emitting element(s) and the battery for energizing the circuit, to facilitate emission of a laser beam from the laser emitter(s) and highlighting one or more features of the lure such as a rotating spinner, a flexible, undulating skirt or a hook, in non-exclusive particular.

SUMMARY OF THE INVENTION

These and other objects of the invention are provided in new and improved laser-illuminated lures which may be retrieved through a water body in conventional fashion and are fitted with a laser circuit and emitter for emitting a laser beam, wherein the emitter is positioned to highlight a selected feature or features of the lures as the lures are retrieved. A battery provided in each lure may be caused to energize the laser circuit by adjusting a removable element of the lure with respect to the primary lure body or manipulating a switch provided in the lure.

BRIEF DESCRIPTION OF THE DRAWING

The invention will be better understood by reference to the accompanying drawing, wherein:

FIG. 1 is a sectional view of a preferred embodiment of the laser-illuminated lure of this invention;

FIG. 2 is a perspective view, partially in section, of a preferred technique for replacing the laser-powering battery in the lure illustrated in FIG. 1;

FIG. 3 is a front view of a preferred target, mounted on the lure illustrated in FIG. 1 for receiving a laser beam generated by the laser circuit in the lure body;

FIG. 4 is a front view of an alternative preferred target for receiving the laser beam;

FIG. 5 is a sectional view of a target encapsulated in the lure body with the laser device for receiving a laser beam and deflecting the laser beam at a selected angle for emission from the lure body;

DESCRIPTION OF THE PREFERRED EMBODIMENTS

Figure 6:
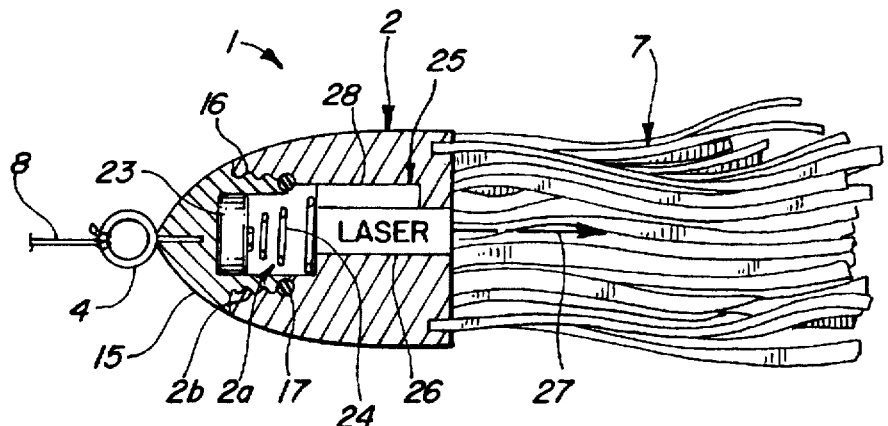
FIG. 6 is a sectional view of an alternative preferred embodiment of the laser-illuminated lure of this invention.

Referring initially to FIGS. 1-3 of the drawing, in a first preferred embodiment a typical laser-illuminated lure of this invention is generally illustrated by reference numeral 1. The laser-illuminated lure 1 includes a hard lure body 2, typically constructed of plastic or other moldable material and fitted with one or more hook eyes 3 for mounting a hook or hooks 5, in conventional fashion. In a preferred embodiment of the invention the hook eye 3 is embedded in a tail cone 14, which is threadably secured in the lure body 2 by means of cone threads 16 that mate with corresponding cavity threads 2b, formed in the lure body 2. In a most preferred embodiment of the invention a gasket 17, illustrated in FIG. 2, is fitted between the tail cone 14 and the lure body 2, in order to seal the inner face of the tail cone 14 in the lure body 2 and prevent water from flowing into the body cavity 2a of the lure body 2. A line eye 4 is further attached to the lure body 2 near a diving blade 10, projecting from the frontal portion of the lure body 2 beneath the line eye 4. A swivel 6 may be attached to the line eye 4, to receive a fishing line 8 for facilitating retrieval of the laser-illuminated lure 1 through a water body. As further illustrated in FIGS. 1 and 3, a deflector 19 is upward-standing from the diving blade 10, in spaced relationship with respect to the frontal portion of the lure body 2 and includes a deflector target 20 such as a mirror, on the front surface thereof for receiving the laser beam 27 from the emitter 26 of a laser 25, encapsulated inside the lure body 2, as illustrated in FIG. 1. The laser beam 27 is emitted from the emitter 26 through a beam corridor 2c provided in the frontal portion of the lure body 2, and the emitter 26 is powered by a laser circuit board 28, energized by a removable battery 23, when the tail cone 14 is threaded tightly in the lure body 2 and biases the battery 23 against a spring 24, provided in the body cavity 2a. Accordingly, the laser circuit board 28 is de-energized by partially unthreading the tail cone 14 in the lure body 2, thereby removing the battery 23 from contact with the spring 24. It will be appreciated by those skilled in the art that the respective elements of the laser 25 may be encapsulated inside the lure body 2, either while the lure body 2 is being molded and shaped, or by mechanical means such as splitting and creating a cavity in the molded lure body 2 and placing the emitter 26 and laser circuit board 28 therein, according to techniques that are well-known to those skilled in the art. Furthermore, the body cavity 2a is positioned to the rear of the lure body 2, to accommodate the battery 23 and facilitate removal of the battery 23 and replacement thereof, by unthreading the tail cone 14 from the rear portion of the lure body 2 at the cone threads 16, as illustrated in FIG. 2 and as deemed necessary.

Referring now to FIGS. 4 and 5 of the drawing, it will be appreciated by those skilled in the art that the deflector 19 can be designed in a variety of configurations to achieve the desired deflection and reflection of the laser beam 27, responsive to emission of the laser beam 27 from the emitter 26 illustrated in FIG. 1. Accordingly, the deflector target 20 can be spherical in order to reflect the laser beam 27 in various directions, as indicated by the arrows in FIG. 4. Alternatively, the deflector target 20 may be flat, as illustrated in FIGS. 1 and 3, to deflect or reflect the laser beam 27 in the direction indicated by the arrows in FIG. 1. Similarly, as illustrated in FIG. 5, the deflector 19 can be encapsulated inside the lure body 2 at a selected angle, to facilitate deflection of the laser beam 27 at that angle, as illustrated by the arrow.

Referring now to FIG. 6 of the drawing, in another embodiment of the invention the laser-illuminated lure 1 is characterized by a lure body 2 having a flexible, stranded skirt 7 extending from the rear segment thereof, which skirt 7 is designed to wave and undulate in the water body upon retrieval of the laser-illuminated lure 1 through the water body. To facilitate retrieval of the laser-illuminated lure 1, a fishing line 8 is tied to a line eye 4 embedded in a nose cone 15, threadably secured in the frontal portion of the lure body 2 by means of cone threads 16 that mate with corresponding cavity threads 2b, formed in the lure body 2. Furthermore, the laser 25 is embedded or encapsulated in the lure body 2, as described above, and a battery 23 and spring 24 may be enclosed within a body cavity 2a, shaped in the lure body 2, wherein the nose cone 15 is removable from the lure body 2 to access the body cavity 2a and replace the battery 23, as deemed necessary. The laser 25 is activated by tightening the nose cone 15 on the lure body 2, thus forcing the battery 23 against the spring 24, and deactivated by reversing this procedure. The emitter 27 element of the laser 25 is oriented such that the laser beam 27 is emitted rearwardly from the rear portion of the lure body 2, onto the skirt 7 to illuminate the undulating, flowing skirt 7 as the laser-illuminated lure 1 is retrieved through the water body. Accordingly, this waving, undulating motion of the skirt 7 as the laser-illuminated lure 1 is retrieved, may be illuminated in any desired color, depending upon the design of the laser 25, to attract fish to the lure.

Figure 7:
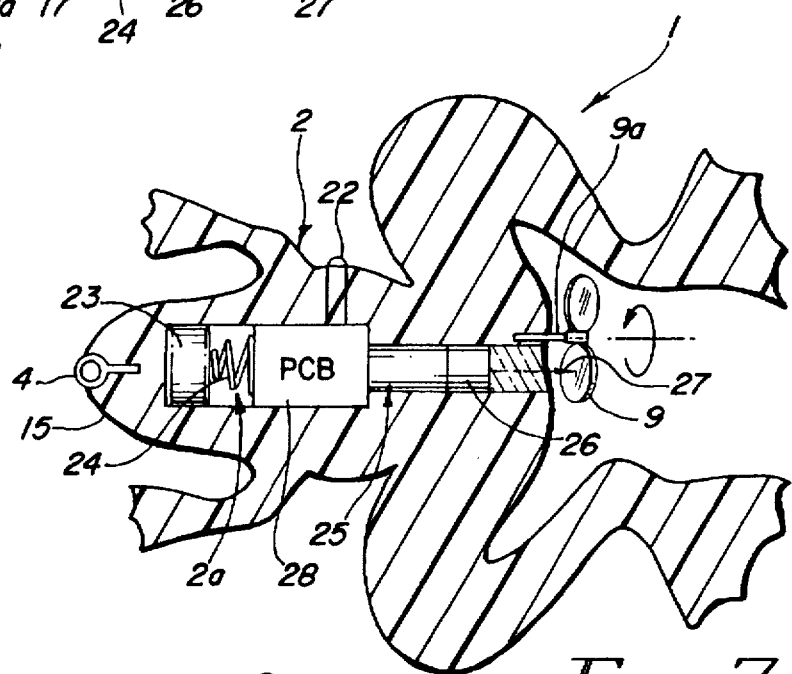
FIG. 7 is a sectional view of yet another preferred embodiment of the invention, wherein the laser-emitting device is positioned inside a soft-body lure.

Referring now to FIG. 7 of the drawing, in yet another preferred embodiment of the invention the laser-illuminated lure 1 is characterized by a flexible, typically soft plastic lure body 2, shaped generally in the configuration of a frog and internally provided with a laser 25. In one embodiment, a reflective spinner 9 is rotatably mounted on a shaft 9a attached to the lure body 2, and the emitter 26 of the laser 25 is aligned with the blades of the spinner 9, such that the laser beam 27 strikes the rotating blades of the spinner 9 as the laser-illuminated lure 1 is retrieved through a water body, to highlight the spinner 9 and attract fish to the laser-illuminated lure 1. As in the case of the laser 25 illustrated in the laser-illuminated lure 1 of FIGS. 1 and 6, the laser circuit board 28 and emitter 26 are encapsulated or embedded in the lure body 2, according to design techniques which are well-known to those skilled in the art. Furthermore, a body cavity 2a is provided in the lure body 2 and a battery 23, as well as a spring 24, is encapsulated in the body cavity 2a. The frontal portion of the lure body 2 may be characterized by a removable nose cone 15, as described above with respect to the lure body 2 illustrated in FIG. 6, such that the body cavity 2a may be accessed for replacing the battery 23. A pressure switch 22 may be optionally provided in the lure body 2 in electrical communication with the laser circuit board 28, to facilitate energizing and de-energizing the laser 25, as desired. Alternatively, the laser 25 can be activated and de-activated by tightening and loosening, respectively, the nose cone 15, as described above with respect to the lure illustrated in FIG. 6.

Figure 8:
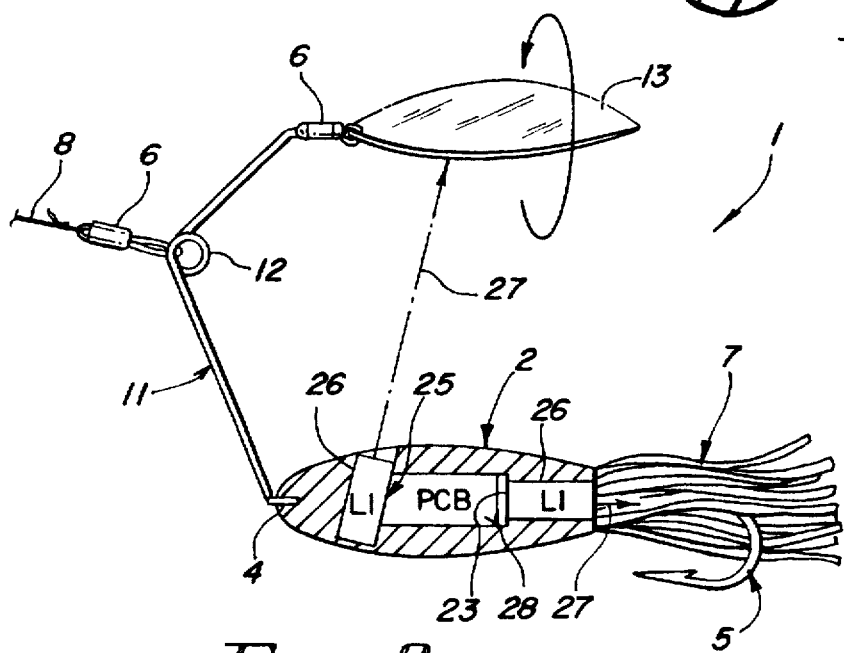
FIG. 8 is a perspective view, partially in section, of a spinner bait-type lure having a hard body, wherein a pair of laser-emitting devices are encapsulated in the hard body of the lure.

Referring now to FIG. 8 of the drawings, in yet another preferred embodiment of the invention the laser-illuminated lure 1 of this invention is characterized by a spinner bait having a hard lure body 2, connected to a rotating spinner blade 13 by means of a wire harness 11. The wire harness 11 is configured to define a harness eye 12, to which is typically attached a conventional swivel 6, which receives one end of a fishing line 8, as illustrated. Accordingly, as the laser-illuminated lure 1 is retrieved through a water body, the spinner blade 13 rotates parallel to the movement of the underlying lure body 2 on a conventional swivel 6, attached to the upper end of the harness 16. Moreover, a pair of emitters 26 are typically embedded or encapsulated in the lure body 2, as illustrated, such that the respective laser beams 27 highlight both the rotating spinner blade 13 and a rippling and undulating skirt 7, extending rearwardly from the lure body 2 and partially hiding the hook 5. The emitters 26 are typically driven by a common laser circuit board 28, powered by an encapsulated battery 23, and the laser 25 may typically be energized by manipulation of a pressure switch 22, also included in the lure body 2, as illustrated.

It will be appreciated by those skilled in the art that the laser-illuminated lures of this invention can be constructed in a wide variety of configurations of many different materials and may include lure bodies 2 which are flexible or hard, as desired. Furthermore, the laser or lasers 25 encapsulated or enclosed in the respective lure bodies 2 may drive one or more emitters 26 to highlight one or more features of the laser-illuminated lures 1, as described above. Moreover, the lure bodies 2 may be provided with pressure switches 22 or fitted with threadably removable and adjustable nose or tail cone members, such as the tail cones 14 illustrated in FIGS. 1 and 2, and the nose cone elements illustrated in FIGS. 6 and 7, which members energize the laser 25 as they are threaded tightly on the lure body 2. Additionally, the emitter 26 element of the laser 25 may be positioned adjacent to a transparent plastic beam corridor 2c, as illustrated in FIG. 1, to accommodate the collimated laser beam 27. Alternatively, the emitter 26 may be positioned at the surface of the lure body 2, as illustrated in FIG. 8, for directing the laser beam 27 directly on the selected target.

It will be further appreciated by those skilled in the art that the particular design of the laser 25, including the emitter 26 and the laser circuit board 28 and other components of the laser 25 may be constructed of sufficient size to fit inside even very small laser-illuminated lures 1, which may be of any desired design. Small flashlights may also be used, with collimated beams of light focused on the respective targets as described above with respect to the lasers 25.

It will be further appreciated by those skilled in the art that the laser 25 of this invention may be of any desired design which is compatible with placement inside a fishing lure in the manner described above. Accordingly, the laser 25 can be a solid-state laser, gas laser, semi-conductor or liquid laser, as desired, depending upon the capacity for miniaturizing these devices. The laser beam 27 of the emitter 26 element of the laser 25 are highly directional, and as such, are easily focused on any desired element of the laser-illuminated lure 1 of this invention, as further described above. Laser light is also monochromatic, and this feature, in combination with the directional feature, facilitates the scattering of the light in a highly visible manner as the laser beam 27 strikes the various deflectors 19 or other reflective elements of the laser-illuminated lure 1, such as the spinner 9 illustrated in FIG. 7, the skirt 7 illustrated in FIGS. 6 and 8 and the spinner blade 13 illustrated in FIG. 8. Because laser light can travel a great distance with little reduction in signal strength, the laser beam 27 is highly visible, even in cloudy or milky water and under a wide variety of water conditions through which the laser-illuminated lure 1 is retrieved.

Typical of the commercially-available lasers that can be used in the invention is the laser pointer diode used in the CL 2003 laser pointer available through HSN Marketing Inc. of Boonton, N. J. The diode laser typically operates at a wavelength of 670 NM and is a class IIIA laser product having a 5 milliwatt output. The laser circuit board 28 and laser emitter 26 are typically driven by one or more small, 1.5 volt wafer (N-Cell) battery and the entire laser 25 may be miniaturized according to techniques well-known to those skilled in the art, typically by application of semiconductor construction, to fit into a lure body 2 of any desired laser-illuminated lure 1.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A laser-illuminated lure comprising a fishing lure and laser beam-emitting means provided in said fishing lure for emitting a laser beam and attracting fish to the fishing lure.

2. The laser-illuminated lure of claim 1 comprising target means provided on said fishing lure for receiving the laser beam.

3. The laser-illuminated lure of claim 1 comprising switch means provided in said fishing lure and electrically connected to said laser beam-emitting means, for selectively energizing said laser beam-emitting means.

4. The laser-illuminated lure of claim 1 comprising:
   (a) target means provided on said fishing lure for receiving the laser beam; and
   (b) switch means provided in said fishing lure and electrically connected to said laser beam-emitting means, for selectively energizing said laser beam-emitting means.

5. The laser-illuminated lure of claim 2 comprising a diving blade provided on said fishing lure and wherein said target means is provided on said diving blade.

6. The laser-illuminated lure of claim 2 wherein said target means comprises a flexible, stranded skirt.

7. The laser-illuminated lure of claim 2 wherein said target means comprises a mirror provided in said fishing lure.

8. The laser-illuminated lure of claim 2 wherein said target means comprises at least one spinner provided on said fishing lure.

9. The laser-illuminated lure of claim 2 comprising a harness provided on said fishing lure, a swivel terminating one end of said harness, and wherein said target means comprises at least one spinner blade rotatably mounted on said swivel.

10. The laser-illuminated lure of claim 9 comprising switch means provided in said fishing lure and electrically connected to said laser beam-emitting means, for selectively energizing said laser beam-emitting means.

11. The laser-illuminated lure of claim 9 wherein said target means further comprises a flexible stranded skirt and wherein said laser beam-emitting means comprises a first laser for focusing a first laser beam on said spinner blade and a second laser for focusing a second laser beam on said skirt.

12. The laser-illuminated lure of claim 11 comprising switch means provided in said fishing lure and electrically connected to said laser beam-emitting means, for selectively energizing said laser-emitting means.

13. A laser-illuminated lure comprising a fishing lure body having a body cavity provided therein; at least one laser device encapsulated in said lure body for emitting at least one collimated beam of light, said laser device including an emitter and a laser circuit board electrically connected to said emitter; light-reflective means carried by said lure body for receiving and reflecting said beam of light; a spring provided in said body cavity in contact with said laser circuit board; a battery provided in said body cavity adjacent to said spring; and an access segment removably threaded in said body cavity, whereby said battery is biased against said spring and powers said emitter, responsive to tightening said access segment in said body cavity.

14. The laser-illuminated lure of claim 13 comprising a diving blade extending from said lure body and wherein said light-reflective means comprises a beam deflector upward-standing from said diving blade.

15. The laser-illuminated lure of claim 13 wherein said light-reflective means comprises a beam-deflector provided in said lure body.

16. The laser-illuminated lure of claim 13 wherein said light-reflective means comprises at least one spinner rotatably carried by said lure body.

17. The laser-illuminated lure of claim 13 wherein said light-reflective means comprises a flexible, stranded skirt extending from said lure body.

18. The laser-illuminated lure of claim 13 wherein said light-reflective means comprises at least one spinner rotatably carried by said lure body and a flexible, stranded skirt extending from said lure body and said at least one laser device comprises a first laser for focusing a first laser beam on said spinner blade and a second laser for focusing a second laser beam on said skirt.

19. A laser-illuminated lure comprising a fishing lure body having a body cavity shaped therein; a pair of laser beam-emitting devices encapsulated in said lure body for emitting separate collimated beams of light from said lure body, each of said devices comprising an emitter and a laser circuit board electrically connected to said emitter; at least one spinner rotatably mounted on said lure body for receiving and reflecting a first one of said beams of light; a flexible, stranded skirt provided on said body for reflecting the second one of said beams of light; a spring provided in said body cavity in contact with said laser circuit board; a battery provided in said body cavity adjacent to said spring; and a closure segment removably threaded in said body cavity, whereby said battery is biased against said spring and powers said emitter responsive to tightening of said closure segment in said body cavity.

20. The laser-illuminated lure of claim 19 comprising a wire harness having one end attached to said body and the opposite end of said wire harness rotatably receiving said spinner.

* * * * *